United States Patent [19]

Suvanto

[11] Patent Number: 4,921,030
[45] Date of Patent: May 1, 1990

[54] SLEEVE-MOUNTED SPIKE FITTED ON A VEHICLE TIRE

[75] Inventor: Erkki Suvanto, Porvoo, Finland

[73] Assignee: Neste Oy, Finland

[21] Appl. No.: 267,117

[22] PCT Filed: Feb. 8, 1988

[86] PCT No.: PCT/FI88/00016
 § 371 Date: Oct. 25, 1988
 § 102(e) Date: Oct. 25, 1988

[87] PCT Pub. No.: WO88/06537
 PCT Pub. Date: Sep. 7, 1988

[30] Foreign Application Priority Data

Feb. 27, 1987 [FI] Finland .................................. 870880

[51] Int. Cl.⁵ .......................................... B60C 11/14
[52] U.S. Cl. ..................................... 152/210; 152/208
[58] Field of Search ............... 152/167, 169, 208, 210, 152/211, 212, 222

[56] References Cited

U.S. PATENT DOCUMENTS 3,786,849  1/1974  Loqvist ............................. 152/210
4,875,515 10/1989  Suvanto ............................ 152/210

FOREIGN PATENT DOCUMENTS 2204074  8/1973  Fed. Rep. of Germany .
 152684  7/1985  Norway .
   3547  of 1906  United Kingdom ............... 152/210

Primary Examiner—Robert A. Dawson
Assistant Examiner—Gregory J. Wilber
Attorney, Agent, or Firm—Steinberg & Raskin

[57] ABSTRACT

The invention concerns a sleeve-mounted spike (10) fitted on a vehicle tire, comprising a rivet (11), a head (12), a tip (13) and a sleeve (14). The clearance (15) between the sleeve (14) and the rivet (11) increases in the direction towards the tip (13). The sleeve (14) has been shaped so that the hole in the sleeve (14) for the rivet (11) has been disposed to increase in diameter towards the tip (13).

6 Claims, 2 Drawing Sheets

SLEEVE-MOUNTED SPIKE FITTED ON A VEHICLE TIRE

BACKGROUND OF THE INVENTION

The present invention concerns a sleeve-mounted spike fitted on a vehicle tyre, comprising a rivet, a head, a tip and a sleeve.

The road attrition effect of spiked tyres has been found to be mainly due to the impact action of the spike in the road contact situation and to the scratching effect from the spike when the spike is pressed against the road surface in conditions of load-bearing tyre, and particularly due to the scratching effect at the very moment when the spike is losing road contact.

The impact produced in the road contact situation of the spike results from the kinetic energy of the spike, from the resisting visco-elastic nature of the rubber and from the friction counter-acting the movement of the spike. The impact at first contact and the road attrition effect can therefore be substantially reduced by removing the causative factors of these phenomena. The expedient of reducing the kinetic energy of the spike by reducing its weight is already known in the art. The object of the present invention is to reduce the other harmful effects.

The scratching effect of the spike, as the tyre rolls, is due to the difference between the radius of the wearing surface and the true radius of rotation, this differential giving rise to a slipping tendency of the tyre surface and thereby producing the scratching effect of the spike. The stress from said slipping tendency is discharged just at the moment when the spike contact ends, and at this time the scratching effect is also at its maximum.

SUMMARY OF THE INVENTION

The object of the invention is to achieve an improvement of sleeve-mounted spikes known in the art. The more detailed object of the invention is to provide a sleeve-mounted spike which reduces the visco-elastic impact from the rubber and the friction of the rivet at the moment when road contact begins, and in which during the road contact situation the scratching phenomenon is avoided, which occurs particularly in its late part.

The objects of the invention are achieved with a sleeve-mounted spike which is maintaly characterized in that the clearance between the sleeve and the rivet increases in the direction towards the tip.

In an advantageous embodiment of the invention, the sleeve has been shaped so that the hole for the rivet in the sleeve has been disposed to increase in diameter towards the tip.

In another advantageous embodiment of the invention, the rivet is shaped so that the diameter of the rivet has been disposed to decrease towards the tip.

The clearance according to the invention may be either symmetrical or asymmetrical.

Significant advantages are gained with the sleeve-mounted spike of the invention. Since in the sleeve-mounted spike either the mouth portion of the sleeve has been made wider or the rivet has been tapered in the direction towards the tip, whereby the tip is enabled to move and the first contact of the tip of the sleeve-mounted spike, which produces road attrition, becomes softer, because the head of the rivet transfers the impact resulting from first contact to the tyre rubber mainly by one of its margins. Similarly, the slipping tendency of the rubber of the vehicle tyre during road contact causes no scratching effect of the tip on the road surface because the construction of the sleeve-mounted spike of the invention permits such movement of the tyre surface due to slipping tendency, independent of the movement of the spike tip. Similar movements of the rivet within the sleeve, due to the slipping tendencies of the rubber, also occur in the direction transverse to the direction of travel, although they are smaller. As a result of soft first contact, and of the fact that the rubber material of the tyre can move freely during road contact while the tip is substantially stationary relative to the road, the rod attrition effect of the sleeve-mounted spike of the invention is considerably less than that encountered with sleeve-mounted spikes of prior art.

BRIEF DESCRIPTION OF THE DRAWING

The invention is described in detail, referring to certain advantageous embodiments of the invention, presented in the figures of the attached drawings. In the drawings.

DESCRIPTION OF THE PREFERRED EMBODIMENTS

Figure 1:
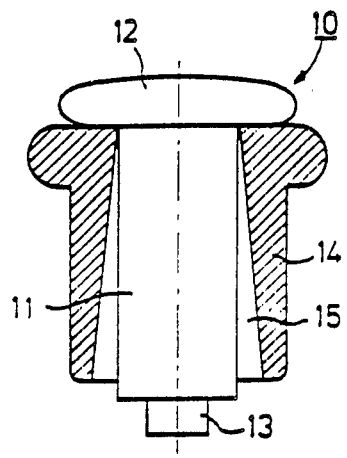
FIG. 1 presents an advantageous embodiment of the sleeve-mounted spike of the invention, in elevational view.
Figure 2:
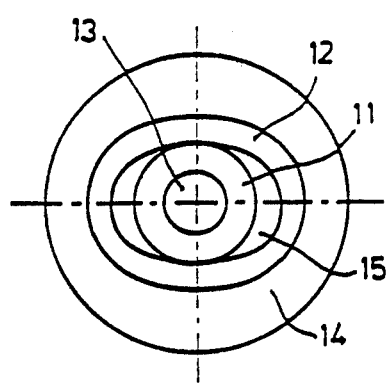
FIG. 2 presents the spike of FIG. 1, seen from below.

In the embodiment of FIGS. 1 and 2, the sleeve-mounted spike of the invention in general is denoted with reference numeral 10. The sleeve-mounted spike 10 comprises a rivet 11, a head 12, a tip 13 and a sleeve 14. According to the basic idea of the invention, the clearance 15 between the sleeve 14 and the rivet 11 increases in the direction towards the tip 13. The rubber material of the tyre is therefore enabled to change shape, that is to flow freely, but the tip 13 is substantially stationary relative to the road. In this embodiment the sleeve 14 has been given such shape that the hole in the sleeve 14 for the rivet 11 has been disposed to increase in diameter towards the tip 13. The hole depicted in FIG. 2 has no uniform clearance. It is clear that the clearance 15 may equally be uniform. It is also clear that the clearance continuously increases substantially over the entire length of the rivet from the head to the tip.

Figure 3:
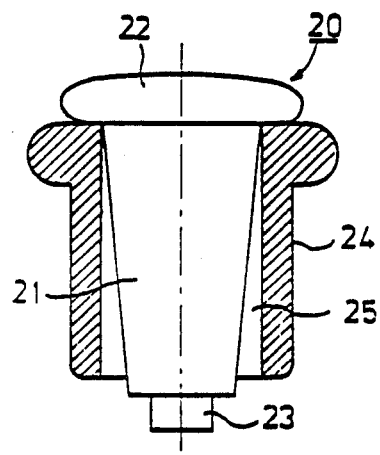
FIG. 3 presents another advantageous embodiment of the sleeve-mounted spike of the invention, in elevational view.

In the embodiment of FIG. 3, the sleeve-mounted spike in general is denoted with reference numeral 20. The sleeve-mounted spike 20 comprises a rivet 21, a head 22, a tip 23 and a sleeve 24. In this embodiment too, the clearance between the sleeve 24 and the rivet 21 increases towards the tip 23. This has been implemented, in the present embodiment, by shaping the rivet 21 so that the diameter of the rivet 21 has been disposed to decrease towards the tip 23.

In the embodiment of FIGS. 1 and 2, respectively of FIG. 3, the clearance 15, of respectively 25, is symmetrical.

Figure 4:
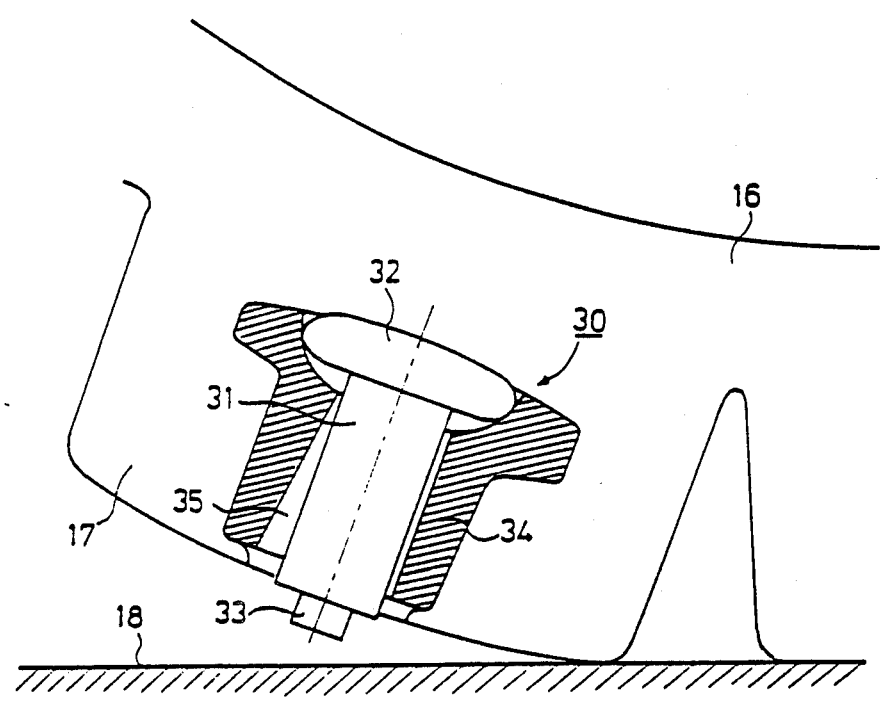
FIG. 4 presents a third advantageous embodiment of the sleeve-mounted spike of the invention, fitted on a vehicle tyre, in elevational view.

In the embodiment of FIG. 4, the sleeve-mounted spike of the invention in general is denoted with reference numeral 30. The sleeve-mounted spike 30 comprises a rivet 31, a head 32, a tip 33 and a sleeve 34. In this embodiment too, the clearance 35 between the sleeve 34 and the rivet 31 increases towards the tip 33. In this embodiment the sleeve 34 has been given such shape that the hole in the sleeve 34 for the rivet 31 has been disposed to increase in diameter asymmetrically towards the tip 33. In FIG. 4, the rubber material of the vehicle tyre is indicated with reference numeral 16, the wear surface of the tyre with 17, and the road surface with 18.

In the foregoing only a few advantageous embodiments of the invention have been presented, and it is clear to a person skilled in the art that numerous modifications thereof are feasible within the scope of the invention idea stated above.

I claim:

1. A sleeve-mounted spike (10; 20; 30) fitted on a vehicle tire, comprising
    a rivet (11; 21; 31),
    a head (12; 22; 32),
    a tip (13; 23; 33),
    a sleeve (14; 24; 34) of substantially the same length as said rivet (11; 21; 31),
    and having a clearance (15; 25; 35) between the sleeve (14; 24; 34) and the rivet (11; 21; 31) when fitted on said vehicle tire;
    said clearance (15; 25; 35) increasing in a direction towards the tip (13; 23; 33),
    wherein said clearance (15; 25; 35) between the sleeve (14; 24; 34) and the rivet (11; 21; 31) continuously increases substantially over the entire length of the rivet (11; 21; 31) from the head in the direction towards the tip (13; 23; 33).

2. Sleeve-mounted spike according to claim 1, wherein the sleeve (14) has been shaped such that a hole in the sleeve (14) for the rivet (11) has been disposed to increase in diameter towards the tip (13).

3. Sleeve-mounted spike according to claim 1, wherein the rivet (21) has been shaped such that diameter of the rivet (21) has been disposed to decrease towards the tip (23).

4. Sleeve-mounted spike according to claim 1, wherein said clearance (15;25) is symmetrical.

5. Sleeve-mounted spike according to claim 1, wherein said clearance (35) is asymmetrical.

6. Sleeve-mounted spike according to claim 1, wherein diameter of said rivet (11; 31) from said head (12; 32) to said tip (13; 33) is substantially constant, and
    inner diameter of said sleeve (14; 34) continuously increases substantially over the entire length of said sleeve (14; 34) in the direction towards said tip (13; 33).

* * * * *